(12) United States Patent
Shilton

(10) Patent No.: US 6,697,829 B1
(45) Date of Patent: Feb. 24, 2004

(54) METHOD OF AND APPARATUS FOR GENERATING RANDOM NUMBERS

(75) Inventor: Mark Golder Shilton, Buckinghamshire (GB)

(73) Assignee: AEA Technology plc, Didcot (GB)

( * ) Notice: Subject to any disclaimer, the term of this patent is extended or adjusted under 35 U.S.C. 154(b) by 0 days.

(21) Appl. No.: 09/622,091

(22) PCT Filed: Feb. 12, 1999

(86) PCT No.: PCT/GB99/00443

§ 371 (c)(1),
(2), (4) Date: Oct. 30, 2000

(87) PCT Pub. No.: WO99/41834

PCT Pub. Date: Aug. 19, 1999

(30) Foreign Application Priority Data

Feb. 12, 1998 (GB) ............................................. 9803055

(51) Int. Cl.⁷ .................................................. G06F 1/02
(52) U.S. Cl. ...................................................... 708/255
(58) Field of Search ................................. 708/255, 250

(56) References Cited

U.S. PATENT DOCUMENTS 5,987,483 A * 11/1999 Edelkind et al. ............. 708/250
6,360,183 B1 * 3/2002 Shilton ........................ 702/179
6,415,309 B1 * 7/2002 Shilton ........................ 708/250

FOREIGN PATENT DOCUMENTS

JP      06 154411 A    6/1994
WO      WO 98/06175    2/1998
WO      WO 98/33075    7/1998

OTHER PUBLICATIONS

J. Von Neumann (summary by G. Forsythe), "Various Techniques Used in Connection with Random Digits," Von Neumann's Collected Works, vol. 5, pp. 768–770, 1963 (XP002103231), reprinted from J. Res. Nat. Bur. Stand., Applied Math. Series 3: 36–38 (1951).

* cited by examiner

*Primary Examiner*—David H. Malzahn
(74) *Attorney, Agent, or Firm*—Drinker Biddle & Reath LLP

(57) ABSTRACT

A random number generator has a random event source, a random event detector, and a counter for counting the number of pulses generated by the detector for a predetermined length of time. Two memories are provided in which are stored successive sets of counts and a controller compares the sets to determine whether one or both of the sets counted one or more events. Where both sets have one or more events, no output is generated, and where both sets have no events, no output is generated. However, where one set has one or more events and the other set has no events, then a binary number is output in dependence on which of the two sets recorded events. This random number generator has the advantage that the probability of counting no events does not have to be exactly equal to the probability of counting one or more events while still ensuring truly random results.

10 Claims, 2 Drawing Sheets

METHOD OF AND APPARATUS FOR GENERATING RANDOM NUMBERS

Figure 1:
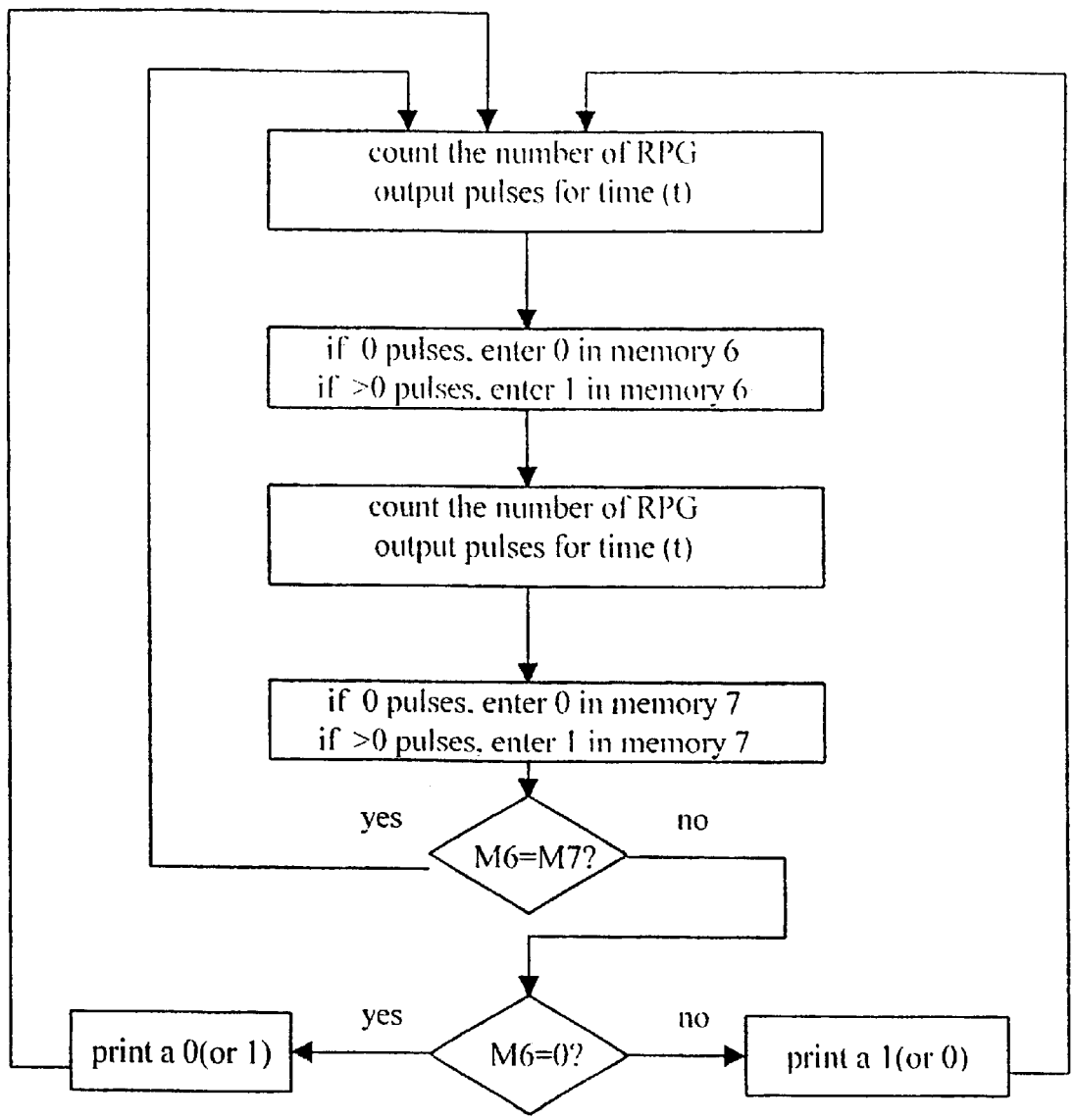

The present invention relates to a method of and apparatus for generating random numbers. The method is generally applicable to any "random event source" in combination with a suitable "random event detector". Where the event detector is set up to emit a discrete recognisable signal that can be counted each time a random event is detected. Such a device is commonly referred to as a "Random Pulse Generator" (RPG).

There are many applications for RPGs. These applications include security monitoring and control, statistical quality control and analysis, gaming machines, message and data encryption, smart cards and other applications. In all of these applications random numbers or random pulses can be used to control a process, a transaction or the transmission and receipt of data and information in such a way that corruption or duplication of the information by human intervention is impossible. Where the random event source uses radio-active material, the special nature of radioactivity makes the RPG very difficult to duplicate or imitate. In applications where the objective is to prevent fraud or corruption RPG's of this type have several advantages over other methods.

The application of a low activity radiation source in conjunction with a PIN diode detector to produce random voltage pulses has been described elsewhere (Japanese patent application JP 6-154411). In this document the random voltage pulses are used to control the operation of a Pachinko gaming machine. In the Pachinko application the device (which is referred to as a Radioactive Random Pulse Generator or RIRPG) is not used to produce random numbers. Similarly in JP 58166448 (NEC CORP.) a system for generating random numbers is described which utilises alpha decay. The system employs a bank of bits positioned equidistant from a uranium source. Each bit is sensitive to alpha rays. When the uranium decays, alpha rays are emitted and strike one or more bits. Those bits that are struck by alpha rays are designated binary '1' and those bits are left unaffected are designated binary '0'. In this way the bank of bits generates a random binary number following exposure to the uranium, the maximum length of which being determined by the number of bits in the bank. However, to ensure truly random numbers, it is essential, as acknowledged in the document, that the probability of the alpha rays emerging from the uranium in any particular direction must be equal to the probabilities for all other directions.

In an article appearing in Proceedings of the IEEE, vol. 66, no. 7 July 1978, pages 807–809 entitled "Generation of Random Bite with Accurate and Reproducible Statistical Properties", F Castanie the accuracy conditions for ensuring the electronic generation of truly random numbers is discussed. However, the design of the circuit for generating the random numbers is complex and does not involve any comparison with predetermined results.

There are several other methods that are well known which can be used to produce random numbers. For example such methods may use mathematical algorithms, so called "white noise", black body radiation, brownian motion and other radioactive methods involving high activities. The most common method uses mathematical algorithms to generate random numbers using a fairly simple computer program and an 8–24 bit processor. Mathematical algorithms produce a stream of numbers that are calculated from an initial seed number using one of several possible mathematical formulas. Each number is then used to produce a seed for the next calculation. There are several types of algorithm which produce streams of numbers with differing degrees of randomness. The numbers are usually described as 'pseudo-random' because they are based on calculation and there is always a chance that a seed number will be repeated which would result in an infinite closed loop of repeat sequences. For most applications mathematical algorithms are adequate but in some applications pure random numbers are preferred. In these circumstances naturally random and unpredictable processes such as radioactive decay may have distinct advantages.

The present invention provides a method of generating random numbers comprising: detecting random events generated by a random event source during a predetermined time period to produce a first set of detected events; detecting random events generated by the random event source during a subsequent time period to produce a second set of detected events; comparing each of the first and second sets of detected events with a predetermined result; and where only one of the first and second sets of detected events corresponds to the predetermined result, generating one of two possible number signals in dependence on which of the first and second sets of detected events corresponds to the predetermined result.

Where both of the sets of detected events correspond to the predetermined result or where neither set of detected events corresponds to the predetermined result then no number signal is generated.

The predetermined result is preferably selected to be the detection of no random events. Thus, where no random events are detected in either of the two sequential detecting time periods or at least one random event is separately detected in both of the two sequential time periods, no number signal is generated.

With the present invention a binary number is generated by checking whether any events are detected during first and second time periods and generating binary number signals where one or more events are detected during only one of the first and second time periods. Thus, matching results are discarded whereas different results are used to generate the random number. With a conventional random number generator, the comparisons used to generate the binary numbers are required to have a probability of exactly ½ or else the numbers produced are not truly random. With the present invention though the probability of the detected events matching or failing to match the predetermined results are permitted to be other than ½. For example, where the probability of the predetermined result being detected is other than ½, there will be a greater likelihood of the detected events matching the predetermined result. Thus, by discarding matching results from two separate detection time periods and generating number signals only where the results differ, a truly random number can be generated.

It will be appreciated that where the probability of the detected events corresponding to the predetermined result substantially equals the probability of the detected events not corresponding to the predetermined result, around 50% of all pairs will generate a number signal. This, though, wastes around 25% of the detected events which will occur in pairs where random events are detected in both time periods. To ensure the greatest efficiency (least number of detected events discarded) the time period during which random events are detected is made sufficiently short that the probability of detecting events in successive time periods is small. Hence, to generate the most number signals per unit time, a time period <<ln 2/(Mean pulse rate) is used.

The present invention also provides apparatus for performing the above method.

In a preferred embodiment the source of random events is an ultra low activity radiation source such as an alpha emitter and the preferred detector is a small semiconductor radiation detector such as a PIN diode. The combined source and detector in the form of an RPG, produces random voltage and/or current pulses. The RPG is robust and miniaturizable. It has the potential to be integrated onto a computer chip. Moreover, the RPG can operate with "virtually no radioactivity" (VNR). For example the activity content may be in the range ~0.04 Bq–37 kBq (~1 pCi–1 $\mu$Ci), typically the activity content is ~37 Bq–4 kBq (~1–100 nCi). Alternatively, natural background radioactivity can be used.

In any event, the use of radioactivity in consumer applications is not new. Certain luminous devices such as wrist watches contain tritium and many domestic smoke detectors contain americium. Their use is commonplace and widespread throughout the world. Consumer applications such as these are permitted by certain national and international regulations which allow products to be exempted from the usual controls which restrict the use of higher activities. With the present invention, the radioactive content is typically 10–1000 times lower than the amount of radioactivity that is used in a domestic smoke detector. Therefore this device would be suitable for use in consumer applications throughout the world.

Although the preferred embodiment of the device uses radioactive decay as the source of random events, the invention is not limited to the use of radioactivity. In principle, the method can apply to any random or pseudo-random process that produces discrete, detectable events.

Figure 2:
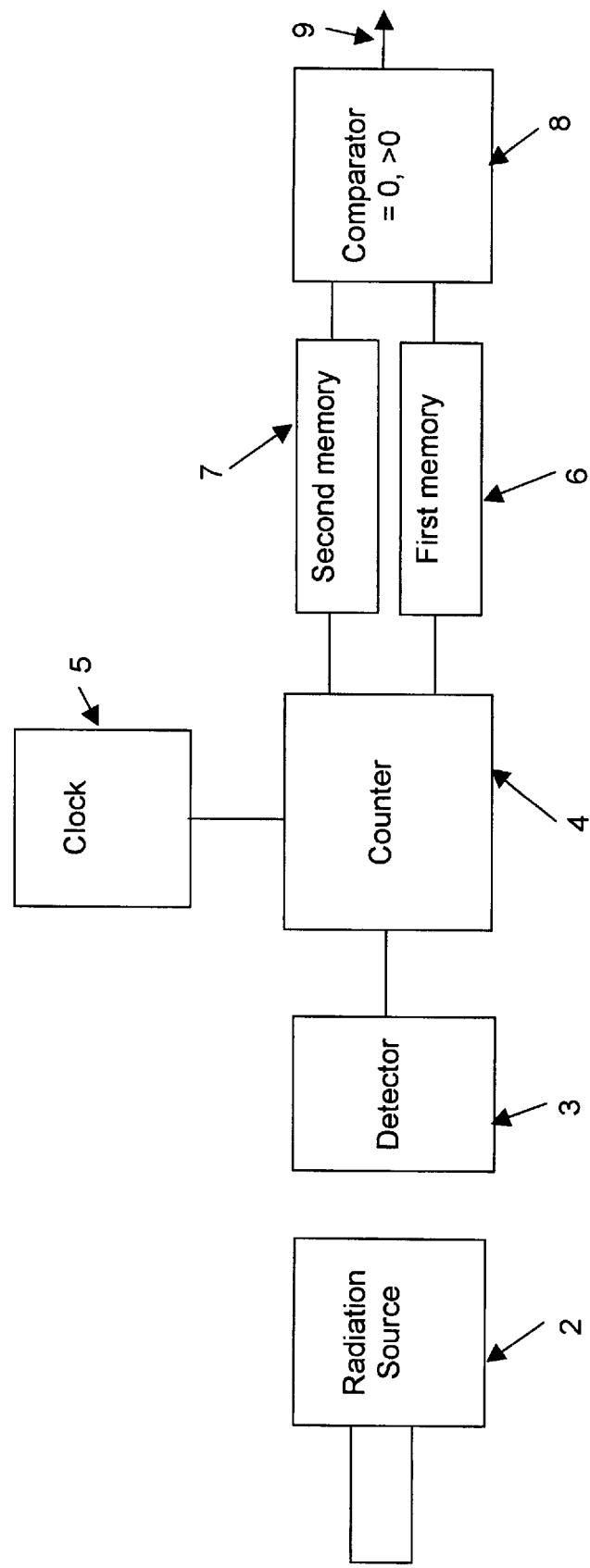

An embodiment of the present invention will now be described by way of example with reference to the accompanying Figures, in which:

FIG. 1 is a logic flow diagram of the steps taken to generate a random number in accordance with the present invention; and FIG. 2 is a schematic diagram of a random number generator in accordance with the present invention.

With reference to FIGS. 1 and 2, a random event source 2 produces random events which are detected in a very simple event detector 3. The detector 3 is configured to emit a recognizable signal each time a random event is detected. As shown in FIG. 2 the source of random events is an ultra low activity radiation source and the preferred detector is a small semiconductor radiation detector such as a PIN diode. The combined source and detector are known as a Radioactive Random Pulse Generator (or RPG). As the source of the random events is radioactive material, the pulses are purely random and unpredictable in time.

The basic design concept of the RPG consists of a low activity radiation source which emits alpha, beta, gamma, X ray, conversion electron, auger electron or other random radiation emissions arising from radioactive decay. The preferred emissions are substantially mono-energetic alpha particles or conversion electrons, more preferably alpha particles from a radionuclide with a long half-life, for example upwards of 140 days such as $^{241}$Am, $^{252}$Cf, $^{250}$Cf, $^{226}$Ra, $^{238}$U, $^{244}$Cm, $^{243}$Cm, $^{228}$Th, $^{208}$Po, $^{209}$Po, $^{210}$Po, $^{238}$Pu or $^{148}$Gd or a combination of these. $^{244}$Cm is preferred (half life=17 yrs) as it has one of the lowest biological toxicity ratings for an alpha emitter. A suitable source of such radiation comprises a small piece of thin metal foil or another solid substrate onto which (or into which) is deposited a small amount of the radioactive material which is substantially fixed and immobilized on or within a few microns of the surface of the source. Such a source is placed in close proximity to a suitable radiation detector which can be a simple PIN diode comprising a small other solid state semiconductor detector. Alternatively radioactivity can be deposited directly onto a silicon chip which can act as the substrate. When a bias voltage is applied to the silicon detector, alpha particles which are emitted by the source into the silicon detector produce a voltage and/or current pulse.

An RPG which is suitable for producing random numbers can have any Mean output between about $10^{-3}$–$10^{6}$ pulses per second. The preferred Mean output per second is $10^{-1}$–$10^{4}$ pulses per second, more preferably 1–1000 pulses per second. The preferred activity is dependent on the output rate of the RPG which is required by the application. Some applications may require hundreds or thousands of pulses per second, others may only require a few pulses per minute.

The random number generator of FIG. 2 uses an RPG with a Mean output of 10 pulses per second. Such an RPG may contain about 26 Bq (0.7 nCi) of a radioactive alpha emitting nuclide if the overall detection efficiency of the PIN diode detector is about 40%.

The detector 3, which includes an amplifier, produces a voltage or current pulse whenever a decaying radioactive nucleus emits a particle or ray into the detector. Pulses are counted by a counting circuit 4 or other suitable counting means. The counting means 4 is connected to a clock 5 so that the total number of pulses from the detector 3 may be counted for a fixed predetermined time interval. The total count or the set of detected events at the end of the time interval is recorded, for example by storing the count in a first memory 6. The clock 5 and the counting means 4 are then reset and a second measurement is made as described above. The total number of counts in the second measurement are stored in a second memory 7.

Both of the memories may be provided as part of a control chip 8. The chip 8 is programmed to interrogate the two memories 6,7 and to print (or to output 9 in any other way) a binary number '1' if the counts in memories are 0 and >0 respectively or a binary number '0' if the two counts are >0 and 0 respectively (or vice versa). If both of the counts are either 0 and 0 or >0 and >0, the chip ignores the measurements and no binary numbers are output. The outputs from the memories would also be connected to further comparators to determine whether a binary 0 or binary 1 should be generated where an enabling signal is received from the OR gate. Thus, a threshold of >0 events is predetermined and used in the generation of binary numbers.

The time interval is important in that the interval is set so that the probability of detecting 0 is much greater than the probability of detecting >0. The aim is to get an output such as 00,00,01,00,01,01,00,00,00,00,01,00,0 . . . i.e. approximately 5 to 10 times more 0 than >0 on average. When this string of binary numbers is divided into pairs, as shown, almost no 1,1 pairs are detected and so no pulses are wasted and discarded as >0, >0 pairs. This is the most efficient in terms of random numbers per unit time (but not the most efficient in terms of the proportion of discarded measurements). The rate of random number production then equals the decay rate of the source. To get the fastest speed (most random numbers per unit time) a counting time period is used of <<ln 2/(Mean pulse rate).

As the probability of detecting successive outputs 0, >0 is always exactly equal to the probability of detecting successive outputs >0, 0, irrespective of the value of the mean pulse rate, the probability of outputting binary number '1'=the probability of outputting binary number '0'. Thus, pure random numbers are always produced. The same procedure may be adopted for any other predetermined threshold with appropriate adjustment of the time interval during which events are detected.

This process may be repeated any number of times. The control chip 8 therefore continually outputs a number '1' or a number '0' every time successive outputs 0, >0 or >0, 0 are detected. Thus, a random binary number is obtained from the random stream of 0's and 1's.

The following is provided to assist in an understanding of the present invention.

The probability of an RPG as described above emitting an output of (m) voltage pulses in a fixed time is described by the Poisson probability distribution function as follows:

1) $^M P_m = M^m \cdot e^{-M}/m!$ where: *(m) is the number of random pulses which occur during the measurement.

*(M) is the Mean pulse output per measurement.

*($^M P_m$) is the probability of (m) voltage pulses occurring.

The probability of the RPG emitting nothing is:

2) $^M P_0 = M^0 \cdot e^{-M}/0! = e^{-M}$

When the probability of emitting nothing is ½ this equation becomes:

3) $½ = e^{-M}$

This can be solved for M to give:

4) Mean (M)=ln 2=0.693147181 . . .

If the probability of emitting nothing is ½ then it stands to reason that the probability of emitting something must also be ½. This is because the total probability of emitting either something or nothing must add up to 1. The above equation predicts that when the Mean pulse output equals ln 2 the probability of emitting something equals the probability of emitting nothing.

This method can be used to produce a stream of random numbers using a succession of single measurements in which a binary number '0' is output when the count is 0 and a binary number '1' is output when the count is >0. But it has the disadvantage that if the mean pulse rate is not exactly equal to ln 2, the probability of outputting binary '1' is then not exactly equal to binary '0'. This causes a "bias" in favour of slightly more binary '0's or binary '1's on average depending on whether the mean was lower or higher than ln 2 respectively. For a real radioactive device which is decaying, it is not always possible to fix the counting time so that the mean pulse rate always equals ln 2, so there is likely to be some bias.

For applications which require "pure" random numbers to be generated, in which the probability of binary '0' exactly equals the probability of binary '1', the bias can be eliminated by using the method of successive counting as described in the above section. By ignoring the pairs of outputs which are equal to each other (i.e. 0,0 or >0,>0), this leaves the other two possible outputs (>0,0 or 0,>0) which have equal probabilities irrespective of the mean pulse rate.

With the present invention, the method of transforming a biased random generator into a pure random generator by ignoring equal outputs is extended and applied to a radioactive random pulse generator which is configured to operate by detecting either something or nothing over two successive measurements.

Before the random number generator can be used the ~26 Bq (~0.7 nCi) RPG must be set up so that the pulse output is counted for a time period which is substantially less than ln 2/(Mean pulse rate). To do this the Mean pulse rate of the RPG must be measured. This only needs to be an approximate measurement and can be done by counting about 1000 pulses. In the above example the Mean output is around 10 pulses per second, and so a measurement of 1000 pulses would therefore take 100 seconds.

The statistical uncertainty in this measurement would give rise to an uncertainty of +/−3.16% (with a confidence level of 68% or 1 standard deviation) in the Mean output of the RPG. This is accurate enough to set the measurement time.

Once the Mean output per second is determined, the measurement time is determined. In this example the required measurement time is set at ln 2/10=0.0693 seconds (+/−3.16% uncertainty) whereby there will be an equal probability of no events being detected or of one or more events being detected.

As a rule of thumb 8 Bq gives rise to about 1 random binary number per second assuming ~35% overall detection efficiency in the device. An exception to this rule is $^{226}$Ra which emits 5 alpha particles per decay so in this case the rate of production per 37 Bq (nCi) is 5 times faster.

The probability of outputting either a binary number 1 or a 0 is exactly equal to ½ using the above time period. This means that all equal length sequences of 1's and 0's have an equal probability of occurring. For example the probability of 16×1's (1111111111111111) is the same as 16×0's (0000000000000000) and is the same as all other random sequences of 16 1's and 0's (such as 1011001110110100 for example). The stream of numbers are truly random and all numbers (i.e. all sequences of 1's and 0's of equal length) occur with equal probability. However, to improve efficiency the time period may be reduced so that there is a greater probability of no events being detected. In this way the number of pairs of events in which events are detected in both sequential time periods is reduced and less detected events are discarded.

Although reference has been made herein to a radioactive event source, alternative random event sources may be employed. Furthermore, although in the above example binary signals are output in dependence on whether no events or one or more events are detected, alternative thresholds may be selected. For example, three or more events etc.

What is claimed is:

1. A method of generating random numbers comprising:

detecting random events generated by a random event source for a first time period of a predetermined length of time to produce a first pulse train of detected events representative of a natural number;

subsequently detecting random events generated by the random event source during a second time period of the same predetermined length of time to produce a second pulse train of detected events representative of a natural number;

comparing each of the first and second pulse trains of detected events with a predetermined result; and where only one of the first and second pulse trains of detected events corresponds to the predetermined result, generating one of two possible number signals in dependence on which of the first and second pulse trains of detected events corresponds to the predetermined result or where both first and second pulse trains of detected events correspond to the predetermined result or neither first nor second pulse trains of detected events correspond to the predetermined result, no number signal is generated.

2. A method as claimed in claim 1, wherein the predetermined result is no random events detected and the first and second pulse trains of detected events are compared with the predetermined result to determine whether the first or second pulse train represents one or more detected events.

3. A method as claimed in claim 1, wherein the detected random events are radioactive decay events.

4. A method as claimed in claim 1, wherein the length of time of the time period for detecting random events is predetermined to be substantially less than ln 2/(Mean Pulse Rate) of the random event source.

5. Apparatus for generating random numbers comprising:
- a random event source;
- a random event detector;
- first and second memories for storing information on first and second pulse trains of detected random events each representative of a natural number;
- a comparator for comparing the stored information with a predetermined result; and
- a binary signal generator for outputting first or second number signals in dependence on the results of the comparison wherein no number signal is generated where both first and second pulse trains of detected events correspond to the predetermined result or neither first nor second pulse trains of detected events correspond to the predetermined result and wherein where only one of the first and second pulse trains of detected events corresponds to the predetermined result, one of two possible number signals is generated in dependence on which of the first and second pulse trains of detected events corresponds to the predetermined result.

6. Apparatus as claimed in claim 5, wherein the comparator includes a memory in which the predetermined result is stored.

7. Apparatus as claimed in claim 6, wherein the predetermined result is no random events detected and the comparator is adapted to determine whether the stored data is representative of one or more detected events.

8. Apparatus as claimed in claim 5, wherein the random event source contains radioactive material and the random event detector is a radiation decay detector.

9. Apparatus as claimed in claim 8, wherein the radioactive material is an alpha emitter.

10. Apparatus as claim in claim 8, wherein the radiation decay detector is a semiconductor detector.

* * * * *